(12) United States Patent
Park

(10) Patent No.: US 9,050,667 B2
(45) Date of Patent: Jun. 9, 2015

(54) CUTTING INSERT FOR RIGHT ANGLE MACHINING AND MILLING CUTTER HAVING THE SAME

(75) Inventor: Chang Gyu Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 189 days.

(21) Appl. No.: 13/997,001

(22) PCT Filed: Jan. 10, 2012

(86) PCT No.: PCT/KR2012/000240
§ 371 (c)(1),
(2), (4) Date: Jun. 21, 2013

(87) PCT Pub. No.: WO2012/099355
PCT Pub. Date: Jul. 26, 2012

(65) Prior Publication Data
US 2013/0294850 A1    Nov. 7, 2013

(30) Foreign Application Priority Data

Jan. 17, 2011 (KR) .......................... 10-2011-0004636

(51) Int. Cl.
*B23C 5/22* (2006.01)
*B23C 5/06* (2006.01)
(Continued)

(52) U.S. Cl.
CPC ............. *B23C 5/22* (2013.01); *Y10T 407/1934* (2015.01); *Y10T 407/23* (2015.01); *B23C 2200/04* (2013.01); *B23C 5/06* (2013.01); *B23C 5/202* (2013.01); *B23C 2200/0405* (2013.01);
(Continued)

(58) Field of Classification Search
CPC .................. B23B 2200/04; B23B 2200/0409; B23B 2200/081; B23B 2200/12; B23B 2200/126; B23B 2200/28; B23C 2200/04; B23C 2200/081; B23C 2200/126; B23C 2200/28
See application file for complete search history.

(56) References Cited

U.S. PATENT DOCUMENTS 4,966,500 A   10/1990   Tsujimura et al.
5,032,049 A   7/1991    Hessman et al.
(Continued)

FOREIGN PATENT DOCUMENTS

JP    04-045617 U    4/1992

OTHER PUBLICATIONS

International Search Report dated Sep. 10, 2012 issued in PCT counterpart application (No. PCT/KR2012/000240).
(Continued)

*Primary Examiner* — Will Fridie, Jr.
(74) *Attorney, Agent, or Firm* — Womble Carlyle

(57) ABSTRACT

A polygonal cutting insert for right angle machining has opposed upper and lower surfaces, a peripheral side surface interconnecting the upper and lower surfaces and having curved first and fourth side surfaces and plane second and third side surfaces, and main and secondary cutting edges alternately formed along the outer peripheries of the upper and lower surfaces. The adjacent main and secondary cutting edges form a right angle therebetween. The first side surface adjoins the main cutting edge of the upper surface. The second side surface adjoins the secondary cutting edge of the lower surface. The third side surface adjoins the secondary cutting edge of the upper surface. The fourth side surface adjoins the main cutting edge of the lower surface. The cutting insert can be mounted on a milling cutter at a positive axial rake angle.

10 Claims, 4 Drawing Sheets

(51) Int. Cl.
  *B23C 5/20* (2006.01)
  *B23C 5/10* (2006.01)

(52) U.S. Cl.
  CPC ..... *B23C2200/203* (2013.01); *B23C 2200/286* (2013.01); *B23C 2210/483* (2013.01); *B23C 2210/66* (2013.01); *B23C 5/109* (2013.01)

(56) References Cited

U.S. PATENT DOCUMENTS

| | | | |
|---|---|---|---|
| 5,232,319 A | | 8/1993 | Satran et al. |
| 5,244,318 A | | 9/1993 | Arai et al. |
| 5,791,833 A | * | 8/1998 | Niebauer .................. 407/114 |
| 5,827,016 A | * | 10/1998 | Strand .................... 407/115 |
| 6,079,912 A | | 6/2000 | Rothballer |
| 6,712,562 B2 | | 3/2004 | Svensson |
| 7,232,279 B2 | | 6/2007 | Smilovici et al. |
| 7,278,805 B2 | * | 10/2007 | Ley .................. 407/114 |
| 7,419,338 B2 | | 9/2008 | Smilovici et al. |
| 7,455,483 B2 | | 11/2008 | Koskinen |
| 8,177,460 B2 | | 5/2012 | Satran et al. |
| 8,231,311 B2 | | 7/2012 | Ballas et al. |
| 8,475,090 B2 | * | 7/2013 | Mergenthaler et al. ....... 408/1 R |
| 2012/0070242 A1 | | 3/2012 | Choi et al. |

OTHER PUBLICATIONS

Written Opinion of the International Searching Authority dated Sep. 10, 2012 issued in PCT counterpart application (No. PCT/KR2012/000240).
Official Action dated Apr. 14, 2014 issued in Japanese counterpart application (No. 2013-548365).
Official Action dated Nov. 15, 2014 issued in Chinese counterpart application (No. 201280005037.2).

* cited by examiner

CUTTING INSERT FOR RIGHT ANGLE MACHINING AND MILLING CUTTER HAVING THE SAME

RELATED APPLICATIONS

This is a 35 USC 371 U.S. National Phase of International Application No. PCT/KR2012/000240 filed 10 Jan. 2012 and published in English as WO 2012/099355A2 on 26 Jul. 2012, which claims priority to KR 10-2011-0004636, filed 17 Jan. 2011. The contents of the aforementioned applications are incorporated by reference in their entirety.

TECHNICAL FIELD

The present invention generally relates to a cutting insert used for milling machining and a milling cutter having the same, and more particularly to a double-sided cutting insert used for right angle machining and a milling cutter having the same.

BACKGROUND ART

Generally, milling machining refers to a process of machining a workpiece made of steel or cast iron into a desired shape by means of a rotating cutting tool or cutter with cutting inserts mounted thereon. Milling machining includes flank machining, right angle machining, drilling, grooving, etc. Among these, right angle machining refers to a milling process of forming a corner portion where two surfaces meet each other at an angle of 90°. Since right angle machining machines the two surfaces at a time, the length of a cutting edge participating in cutting is relatively long, and thus, the entire cutting edge is subjected to more resistance. Accordingly, right angle machining needs to effectively disperse such resistance and enhance the service life of a tool.

As an example of a conventional cutting insert for right angle machining, there is known in the art a single-sided cutting insert that has a cutting edge only between an upper surface and a flank surface and has no cutting edge between a lower surface and the flank surface. Such a single-sided cutting insert, however, has a short life expectancy and is inefficient due to few available cutting edges.

Further, there is known in the art a cutting insert for right angle machining, which has cutting edges between a lower surface and a flank surface as well as between an upper surface and the flank surface and thus can be used with its double sides. By way of example, Korean Patent Application Publication No. 10-2008-0041260 discloses a cutting insert wherein an upper surface and a lower surface meet a flank surface at an angle of 90°. According to the abovementioned reference, to ensure a relief angle when machining a workpiece, a cutting insert must be positioned in such a manner that an angle formed by a cutting edge of the cutting insert relative to a central axis of a milling cutter (i.e., an axial rake angle) is negative. If the cutting insert is positioned at a negative rake angle, then the cutting insert is subjected to more resistance compared to a positive rake angle. Thus, such a cutting insert is unsuitable for cutting machining with high speed, high feed rate or high depth of cut. To address such a problem, the conventional cutting insert is designed such that the cutting edge is obliquely arranged nonparallel to the upper or lower surface to reduce the negative degree of the rake angle. Nonetheless, the conventional cutting insert still has difficulties in performing an effective cutting in cutting machining with high speed, high feed rate or high depth of cut.

SUMMARY

To solve the aforesaid problems, it is an object of the present invention to provide a double-sided cutting insert for right angle machining, which can perform stable cutting in cutting machining with high speed, high feed rate or high depth of cut, as well as a milling cutter having the same.

It is another object of the present invention to provide a cutting insert, which can provide a machined surface having an improved degree of perpendicularity in right angle machining, as well as a milling cutter having said cutting insert.

A cutting insert according to the present invention is a polygonal cutting insert for right angle machining. The cutting insert comprises: opposed upper and lower surfaces; a peripheral side surface interconnecting the upper surface and the lower surface at outer peripheries of the upper surface and the lower surface; and at least one main cutting edge and at least one secondary cutting edge alternately formed along the outer peripheries of the upper surface and the lower surface. An adjacent pair of the main cutting edge and the secondary cutting edge form a substantially right angle therebetween. The peripheral side surface includes: a first side surface adjoining the main cutting edge of the upper surface; a second side surface adjoining the secondary cutting edge of the lower surface; a third side surface adjoining the secondary cutting edge of the upper surface; and a fourth side surface adjoining the main cutting edge of the lower surface. The first side surface forms a first obtuse angle relative to the upper surface. The second side surface forms a second obtuse angle less than the first obtuse angle relative to the upper surface. The third side surface forms a first acute angle relative to the upper surface. The fourth side surface forms a second acute angle less than the first acute angle relative to the upper surface. The upper surface and the lower surface are rotationally symmetrical around an axis perpendicular to a central axis of the cutting insert.

Further, in the cutting insert according to the present invention, the main cutting edge comprises a convex curve in a radial direction of the cutting insert when viewing the cutting insert from the above and below. Moreover, the main cutting edge comprises a curve concave toward a center in thickness of the cutting insert when viewing the cutting insert from the side.

Additionally, when viewing the cutting insert from the above and below, the first and fourth side surfaces comprise a convex curve surface along the main cutting edge and the second and third side surfaces comprise a plane surface. Widths of the first and fourth side surfaces become narrower away from the main cutting edge and widths of the second and third side surfaces become narrower toward the secondary cutting edge.

Also, in the cutting insert according to the present invention, the secondary cutting edge comprises a straight line when viewing the cutting insert from the side and from the above and below. Further, the secondary cutting edge comprises a convex curve in a thickness direction of the cutting insert when viewing the cutting insert from the side and comprises a convex curve in a radial direction of the cutting insert when viewing the cutting insert from the above and below.

Further, in the cutting insert according to the present invention, the cutting insert comprises three main cutting edges and three secondary cutting edges at the upper surface and three main cutting edges and three secondary cutting edges at the lower surface. An imaginary circle inscribed with the upper or lower surface of the cutting insert is inscribed with the main cutting edges at three points.

A milling cutter according to the present invention includes a cutter body having a plurality of insert pockets. Each insert pocket is configured to receive the cutting insert. The insert pocket has a supporting surface abutting and supporting the upper or lower surface of the cutting insert. The supporting surface of the insert pocket forms a positive rake angle relative to a central rotational axis of the cutter body. The cutting insert is mounted on the insert pocket at a positive axial rake angle.

The present invention provides the double-sided cutting insert for right angle machining, which is positioned at a rake angle positive relative to the axial direction of the milling cutter. Thus, by using the double-sided cutting insert, stable cutting can be performed in cutting machining with high speed, high feed rate or high depth of cut with respect to right angle machining.

Further, the present invention can provide the cutting insert, which can provide a machined surface having an increased degree of perpendicularity in right angle machining by reducing machining errors resulting from change in depth of cut, as well as the milling cutter having said cutting insert.

Furthermore, the present invention can provide the double-sided cutting insert that ensures a longer length of the main cutting edge compared to other same-sized cutting inserts with upper and side surfaces perpendicular to each other.

DETAILED DESCRIPTION

A double-sided cutting insert for right angle machining and a milling cutter having the same according to the present invention are described in detail with reference to the accompanying drawings.

Figure 1:
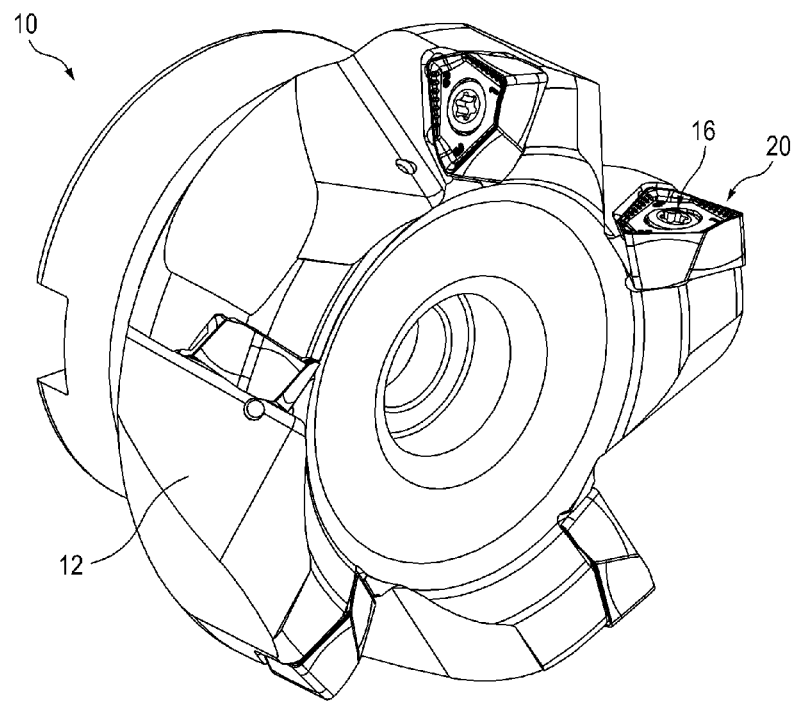
FIG. 1 is a perspective view of a milling cutter according to the present invention.
Figure 7:
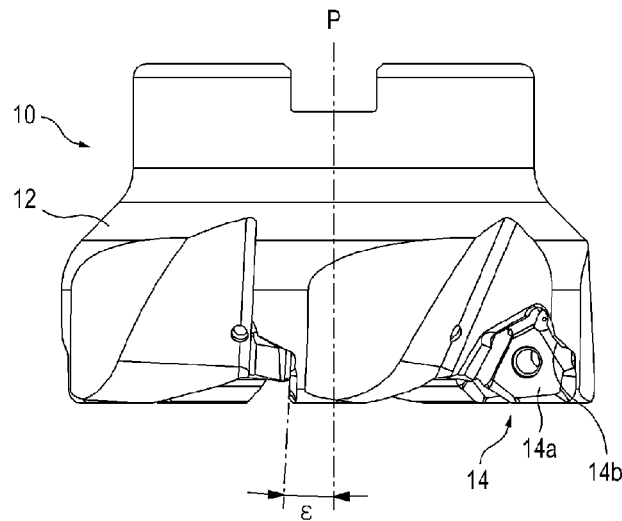
FIG. 7 is a side view of the milling cutter according to the present invention without the cutting insert.
Figure 10:
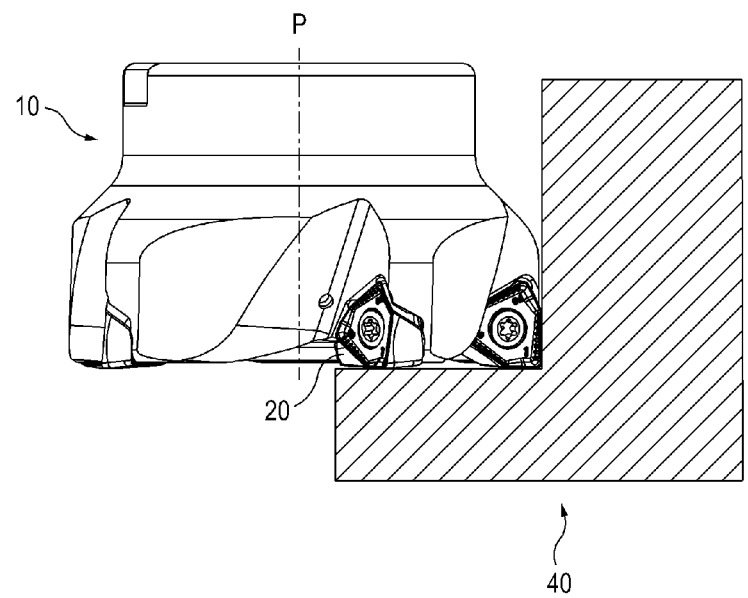
FIG. 10 shows an operation of the milling cutter shown in FIG. 1.

FIGS. 1, 7 and 10 show a milling cutter including a double-sided cutting insert for right angle machining according to the present invention.

As shown in FIGS. 1, 7 and 10, the milling cutter 10 according to the present invention comprises a cutter body 12 and at least one cutting insert 20. Each cutting insert 20 is seated on respective pockets 14 (see FIG. 7), which are formed at predetermined angular spacing along an outer periphery of the cutter body 12 of the milling cutter 10. The cutting insert 20 is secured to the cutter body 12 of the milling cutter 10 by means of a clamping screw 16. The milling cutter 10 rotates around a central rotational axis P (see FIG. 7) during a cutting process. The milling cutter 10 performs right angle machining on a workpiece 40 (see FIG. 10) by means of cutting edges of the cutting inserts 20, which are positioned to protrude from the outer periphery of the cutter body 12 of the milling cutter 10. Details of the right angle machining performed by the milling cutter 10 according to the present invention will be described below more fully.

Reference is now made to FIGS. 2 to 6 and descriptions are made in detail as to the cutting insert 20 according to the present invention.

Figure 2:
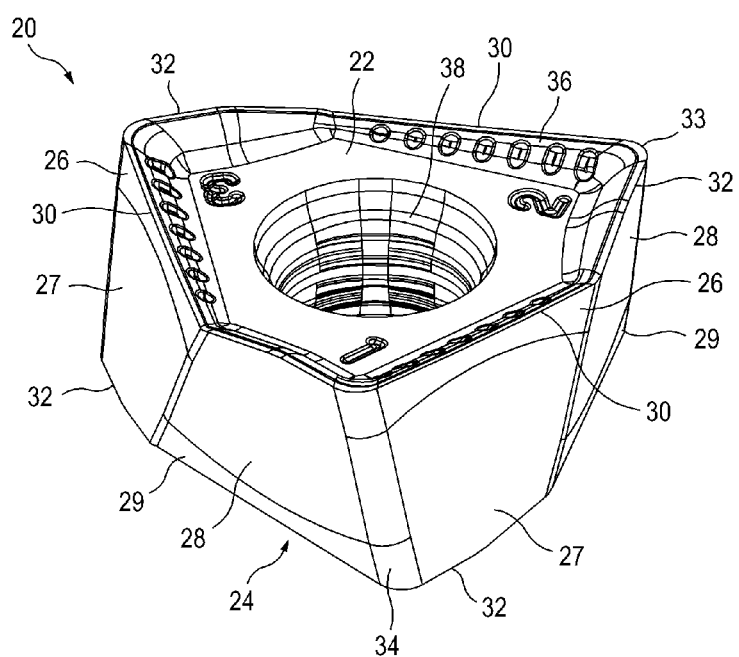
FIG. 2 is a perspective view of a double-sided cutting insert for right angle machining according to the present invention.

FIG. 2 shows a hexagonal cutting insert 20 with six sides. The cutting insert 20 according to the present invention includes the following: an upper surface 22 and a lower surface 24; peripheral side surfaces interconnecting the upper surface 22 and the lower surface 24 at outer peripheries of the upper surface 22 and the lower surface 24; curved corner side surfaces 34 each smoothly interconnecting adjacent side surfaces; and a cylindrical through bore 38 extending through the upper surface 22 and the lower surface 24. Further, the cutting insert 20 includes at least one main cutting edge 30 and at least one secondary cutting edge 32. The main cutting edges 30 and the secondary cutting edges 32 are alternately formed along the outer peripheries of the upper surface 22 and the lower surface 24. The adjacent pair of the main cutting edge 30 and the secondary cutting edge 32 form an included angle of a substantially right angle therebetween. A corner cutting edge 33 is formed between the adjacent pair of the main cutting edge 30 and the secondary cutting edge 32. That is, the main cutting edge 30 is located at one circumferential side of the corner cutting edge 33, while the secondary cutting edge 32 is located at the other circumferential side of the corner cutting edge 33. The cutting insert 20 includes chip breakers 36 that are formed between the upper surface 22 and the cutting edges (the main cutting edge 30, the secondary cutting edge 32 and the corner cutting edge 33) and between the lower surface 24 and the cutting edges.

The upper surface 22 and the lower surface 24 of the cutting insert 20 according to the present invention are rotationally symmetrical around an axis perpendicular to a central axis of the through bore 38 of the cutting insert 20. The upper surface 22 and the lower surface 24 have a same size.

Figure 3:
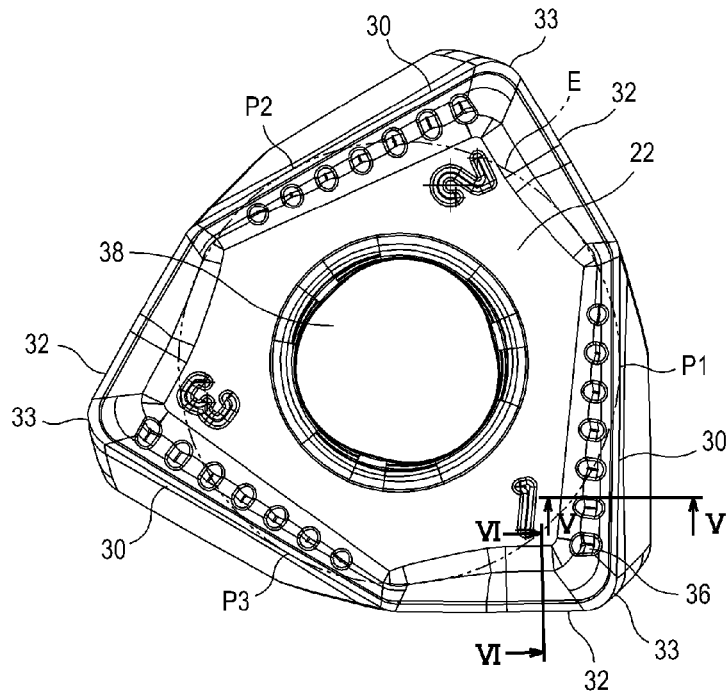
FIG. 3 is a top view of the cutting insert shown in FIG. 2.

Referring to FIG. 3, the main cutting edges 30, the secondary cutting edges 32 and the corner cutting edges 33 of the cutting insert 20 according to the present invention are rotationally symmetrical around the central axis of the cylindrical through bore 38, when viewing the cutting insert from above. The upper and lower surfaces 22, 24 have a generally hexagonal shape. Alternatively, the cutting insert having a polygonal shape other than a hexagon may also be used. Preferably, the cutting insert 20 has three main cutting edges 30 and three secondary cutting edges 32 at the upper surface 22. Further, preferably, an imaginary circle E, which is inscribed with the upper surface 22 of the cutting insert, is inscribed with said three main cutting edges at three points P1, P2, P3. When the milling cutter 10 with the cutting inserts 20 mounted thereon performs the cutting operation, one of the upper surface 22 and the lower surface 24 may be selectively used. Further, one pair of the main and secondary cutting edges among the plurality of the main and secondary cutting edges formed at the upper surface 22 and the lower surface 24 may be selectively used.

The main cutting edge 30 is formed to have curvature convex in a radial direction of the cutting insert when viewing the cutting insert from above and below. Said convex curvature has a radius of curvature of about 100 mm to about 400 mm, preferably about 150 mm to about 350 mm. Thus, when the milling cutter 10 with the cutting insert 20 mounted thereon machines the workpiece 40, machining errors caused by variation in depth of cut in each cutting position is reduced and thereby a precision in right angle machining is greatly enhanced. Accordingly, precise machined surfaces having an increased degree of perpendicularity can be achieved without additional use of high-precision finishing tools, thereby greatly contributing to productivity enhancement.

Figure 4:
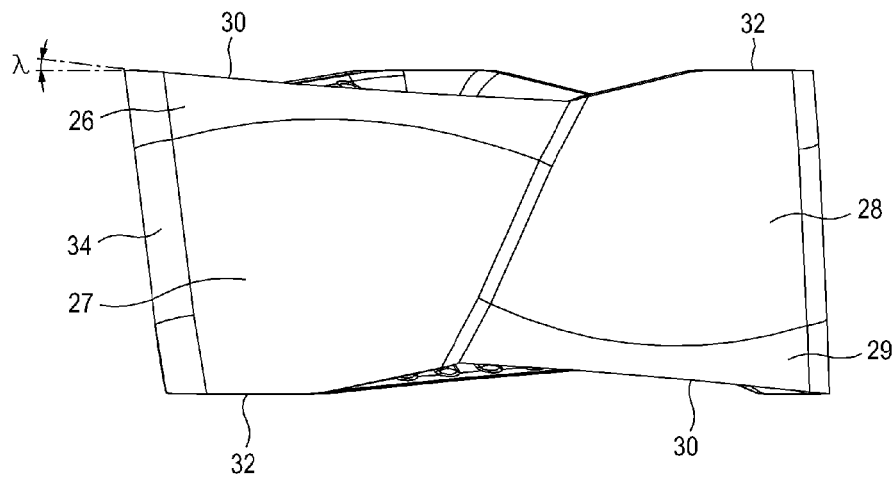
FIG. 4 is a side view of the cutting insert shown in FIG. 2.

Referring to FIG. 4, the main cutting edge 30 is formed to have curvature concave toward a center in thickness of the cutting insert when viewing the cutting insert from side. Said concave curvature has a radius of curvature of about 30 mm to about 250 mm, preferably about 50 mm to 170 mm. With such configuration, a positive angle $\lambda$, which the main cutting edge 30 forms relative to the upper surface 22 of the cutting insert 20, can become greater compared to a straight main cutting edge.

Referring to FIGS. 3 and 4, the secondary cutting edge 32 is formed to be straight when viewing the cutting insert from side and from above and below.

Alternatively, in another embodiment of the present invention, the secondary cutting edge 32 may be formed to be a curve that is convex in the radial direction of the cutting insert when viewing the cutting insert from above and below and also convex in the thickness direction of the cutting insert when viewing the cutting insert from side.

As shown in FIGS. 2 and 4, the peripheral side surface comprises a first side surface 26, a second side surface 27, a third side surface 28 and a fourth side surface 29. The first side surface 26 adjoins the main cutting edge 30 of the upper surface 22. The second side surface 27 adjoins the secondary cutting edge 32 of the lower surface 24. The third side surface 28 adjoins the secondary cutting edge 32 of the upper surface 22. The fourth side surface 29 adjoins the main cutting edge 30 of the lower surface 24. The first side surfaces 26, the second side surfaces 27, the third side surfaces 28 and the fourth side surfaces 29 are rotationally symmetrical around the central axis of the through bore 38, respectively. The first side surfaces 26 and the fourth side surfaces 29 are formed to be a curved surface along the main cutting edge 30 convexly curved when viewing the cutting insert from above and below. Widths of the first side surface 26 and the fourth side surface 29 become narrower away from the main cutting edge 30. The second side surface 27 and the third side surface 28 are formed to be a plane surface. Widths of the second side surface 27 and the third side surface 28 become narrower toward the secondary cutting edge 32. The second side surface 27 and the third side surface 28 serve as a reference mount surface, which abuts the surface of the pocket 14 when the cutting insert 20 is mounted on the pocket 14 of the milling cutter 10. Since the second side surface 27 and the third side surface 28 are plane, the cutting insert 20 can be more stably mounted on the pocket 14 of the milling cutter 10 in a desired position.

Figure 5:
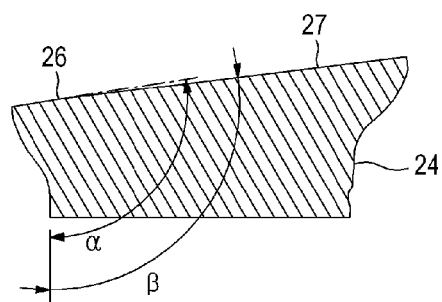
FIG. 5 is a sectional view of the cutting insert taken along the line V-V in FIG. 3.

FIG. 5 is a sectional view of the cutting insert 20, which is taken along the line V-V in FIG. 3. The first side surface 26 forms a first obtuse angle $\alpha$ relative to the upper surface 22. It is preferred that the first obtuse angle $\alpha$ has an included angle of about 95° to about 105°. The second side surface 27 forms a second obtuse angle $\beta$ relative to the upper surface 22. The second obtuse angle $\beta$ is less than the first obtuse angle $\alpha$. It is preferred that the second obtuse angle $\beta$ has an included angle of about 93° to about 103°. With the above-described configuration, the cutting insert 20 according to the present invention can have a greater relief angle compared to a cutting insert, a peripheral surface of which comprises a single plane surface.

Figure 6:
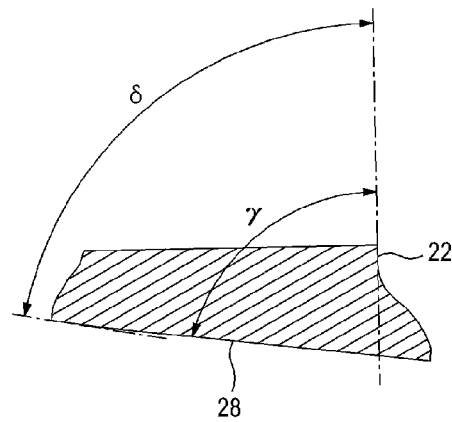
FIG. 6 is a sectional view of the cutting insert taken along the line VI-VI in FIG. 3.

FIG. 6 is a sectional view of the cutting insert 20, which is taken along the line VI-VI in FIG. 3. The third side surface 28 forms a first acute angle $\gamma$ relative to the upper surface 22. It is preferred that the first acute angle $\gamma$ has an included angle of about 77° to about 87°. Further, a sum of the first acute angle $\gamma$ and the second obtuse angle $\beta$ become 180°. The fourth side surface 29 forms a second acute angle $\delta$ relative to the upper surface 22. The second acute angle $\delta$ is less than the first acute angle $\gamma$. It is preferred that the second acute angle $\delta$ has an included angle of about 75° to about 85°. Further, a sum of the second acute angle $\delta$ and the first obtuse angle $\alpha$ become 180°. With the above-described configuration, the cutting insert 20 according to the present invention can have a longer main cutting edge in the same size, when compared to other cutting inserts for right angle machining with right-angled side and upper surfaces.

Reference is made to FIGS. 7 to 10 and descriptions are made as to the milling cutter 10 with the cutting insert 20 according to the present invention mounted thereon as well as the operation during the right angle machining.

FIG. 7 shows the milling cutter 10 according to the present invention, wherein the cutting insert 20 is not mounted on the milling cutter. At least one pocket 14 is formed at the outer periphery of the cutter body 12 of the milling cutter 10. The pocket 14 includes a first supporting surface 14a with a bore formed therein and at least one second supporting surface 14b at its side. The first supporting surface 14a of the pocket 14 has a positive rake angle $\epsilon$ relative to the central rotational axis P of the milling cutter 10. The rake angle $\epsilon$ is in the range of about 0° to about 10°, preferably about 2° to about 5°. The cutting insert 20 is coupled to each pocket 14. When coupled, the lower surface 24 (or the upper surface 22) of the cutting insert 20 is seated on the first supporting surface 14a of the pocket 14, while the second side surface 28 of the cutting insert is seated on the second supporting surface 14b of the pocket 14. Subsequently, the clamping screw 16 is inserted to the cylindrical through bore 38 of the cutting insert 20 and then to the bore of the pocket 14, thus securing the cutting insert 20 to the milling cutter 10.

Figure 8:
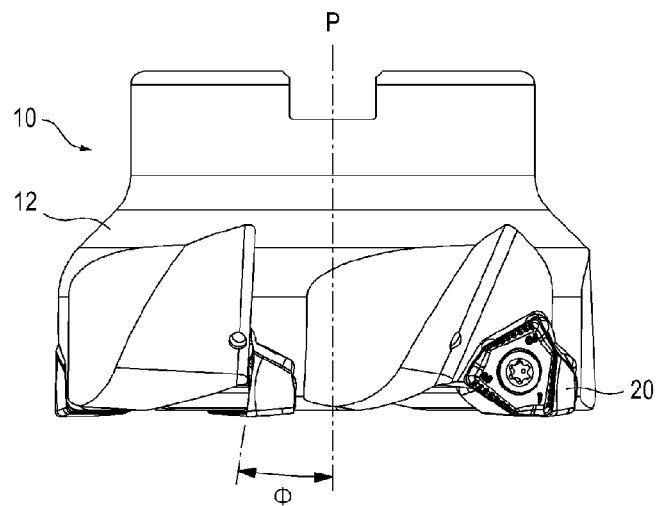
FIG. 8 is a side view of the milling cutter shown in FIG. 1.
Figure 9:
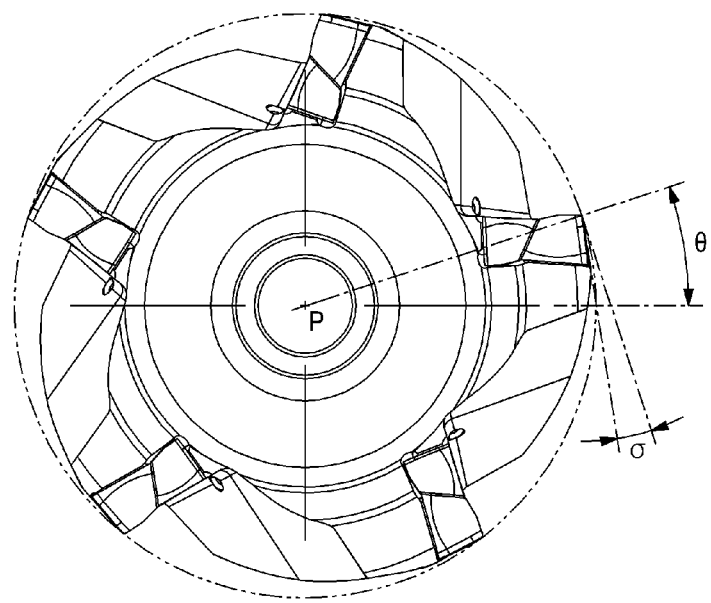
FIG. 9 is a top view of the milling cutter shown in FIG. 1.

FIGS. 8 and 9 show the milling cutter 10 with the cutting insert 20 according to the present invention mounted thereon. The upper surface 22 of the cutting insert 20 has a positive axial rake angle $\phi$ relative to the central rotational axis P of the milling cutter 10. The axial rake angle $\phi$ of the cutting insert is greater than the rake angle $\epsilon$ (see FIG. 7) of the first supporting surface 14a of the pocket 14. The axial rake angle $\phi$ of the cutting insert is in the range of about 5° to about 20°, preferably about 5° to about 15°.

Referring to FIG. 9, the upper surface 22 of the cutting insert 20 has a rake angle $\theta$ that is negative in a radial direction of the milling cutter 10. The radial rake angle $\theta$ is in the range of about 10° to about 30°, preferably about 15° to about 25°. The main cutting edge 30 has a relief angle $\sigma$ relative to a machined surface. Preferably, the relief angle $\sigma$ is in the range of about 5° to about 15°.

FIG. 10 show the operation of the milling cutter 10 with the cutting insert 20 according to the present invention mounted thereon. As the cutter body 12 of the milling cutter 10 rotates around the central rotational axis P, a plurality of the cutting inserts 20 are rotated to thus machine the workpiece 40. During such rotation, the main cutting edge 30 of the cutting insert 20 machines an upright surface of the workpiece 40, while the secondary cutting edge 32 machines a base surface of the workpiece 40.

According to the present invention, the secondary cutting edge 32 of the cutting insert 20 cuts the base surface of the workpiece 40 as the cutting insert 20 is positioned at the positive axial rake angle relative to the central rotational axis P of the milling cutter 10. Thus, more stable cutting can be achieved in a cutting process with high speed, high feed rate and high depth of cut, when compared to the case that both the main cutting edges and the secondary cutting edges are negatively positioned.

The milling cutter 10 performs the right angle machining on the workpiece 40 as described above. Thus, the upright surface and the base surface of the workpiece 40 form a right angle therebetween.

While the present invention has been described herein with reference to the foregoing embodiments depicted in the accompanying drawings, the foregoing embodiments are for purposes of exemplification of the present invention and the present invention should not be limited thereto. It will be apparent to those of ordinary skill in the art that various substitutions, alternations and modifications may be made without departing from the scope of the present invention.

The invention claimed is:

1. A cutting insert having a polygonal shape for right angle machining, comprising:
    opposed upper and lower surfaces;
    a peripheral side surface interconnecting the upper surface and the lower surface at outer peripheries of the upper surface and the lower surface; and
    at least one main cutting edge and at least one secondary cutting edge alternately formed along the outer peripheries of the upper surface and the lower surface,
    wherein an adjacent pair of the main cutting edge and the secondary cutting edge form a substantially right angle therebetween,
    wherein the peripheral side surface includes:
        a first side surface adjoining the main cutting edge of the upper surface;
        a second side surface adjoining the secondary cutting edge of the lower surface;
        a third side surface adjoining the secondary cutting edge of the upper surface; and
        a fourth side surface adjoining the main cutting edge of the lower surface,
    wherein the first side surface forms a first obtuse angle relative to the upper surface, the second side surface forms a second obtuse angle less than the first obtuse angle relative to the upper surface, the third side surface forms a first acute angle relative to the upper surface, and the fourth side surface forms a second acute angle less than the first acute angle relative to the upper surface, and
    wherein the upper surface and the lower surface are rotationally symmetrical around an axis perpendicular to a central axis of the cutting insert.

2. The cutting insert of claim 1, wherein the main cutting edge comprises a convex curve in a radial direction of the cutting insert when viewing the cutting insert from above and below.

3. The cutting insert of claim 2, wherein when viewing the cutting insert from above and below, the first and fourth side surfaces comprise a convex curved surface along the main cutting edge and the second and third side surfaces comprise a plane surface.

4. The cutting insert of claim 3, wherein the main cutting edge comprises a curve concave toward a center in thickness of the cutting insert when viewing the cutting insert from side.

5. The cutting insert of claim 4, wherein widths of the first and fourth side surfaces become narrower away from the main cutting edge and widths of the second and third side surfaces become narrower toward the secondary cutting edge.

6. The cutting insert of claim 1, wherein the secondary cutting edge comprises a straight line when viewing the cutting insert from side and from above and below.

7. The cutting insert of claim 1, wherein the secondary cutting edge comprises a convex curve in a thickness direction of the cutting insert when viewing the cutting insert from side and comprises a convex curve in a radial direction of the cutting insert when viewing the cutting insert from above and below.

8. The cutting insert of claim 1,
    wherein the cutting insert comprises three main cutting edges and three secondary cutting edges at the upper surface and three main cutting edges and three secondary cutting edges at the lower surface, and
    wherein an imaginary circle inscribed with the upper or lower surface of the cutting insert is inscribed with the main cutting edges at three points.

9. A milling cutter, comprising:
    the cutting insert of claim 1; and
    a cutter body having a plurality of insert pockets each receiving the cutting insert,
        wherein the insert pocket has a supporting surface abutting and supporting the upper surface or the lower surface of the cutting insert, the supporting surface forming a positive rake angle relative to a central rotational axis of the cutter body, and
        wherein the cutting insert is mounted on the insert pocket at a positive axial rake angle.

10. The milling cutter of claim 9, wherein the axial rake angle of the cutting insert is greater than the rake angle of the supporting surface of the insert pocket.

* * * * *